(12) United States Patent
Hayasaka et al.

(10) Patent No.: US 11,674,920 B2
(45) Date of Patent: Jun. 13, 2023

(54) MOISTURE-SENSITIVE FILM AND SENSOR USING SAME

(71) Applicant: SUMITOMO CHEMICAL COMPANY, LIMITED, Tokyo (JP)

(72) Inventors: Megumi Hayasaka, Osaka (JP);
Yoshifumi Komatsu, Osaka (JP);
Yoshihiro Harada, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 20 days.

(21) Appl. No.: 16/956,865

(22) PCT Filed: Mar. 22, 2019

(86) PCT No.: PCT/JP2019/012051
§ 371 (c)(1),
(2) Date: Jun. 22, 2020

(87) PCT Pub. No.: WO2019/188770
PCT Pub. Date: Oct. 3, 2019

(65) Prior Publication Data
US 2021/0055247 A1 Feb. 25, 2021

(30) Foreign Application Priority Data
Mar. 29, 2018 (JP) .............................. JP2018-063937

(51) Int. Cl.
*G01N 27/22* (2006.01)
(52) U.S. Cl.
CPC ................................. *G01N 27/225* (2013.01)

(58) Field of Classification Search
CPC .... G01N 27/121; G01N 27/22; G01N 27/221;
G01N 27/222; G01N 27/223;
(Continued)

(56) References Cited

U.S. PATENT DOCUMENTS 4,965,698 A * 10/1990 Thoma ..................... G01M 3/16
29/25.42
5,408,381 A 4/1995 Thoma et al.

FOREIGN PATENT DOCUMENTS

| CN | 102491911 A | 6/2012 |
| CN | 104592756 A | 5/2015 |

(Continued)

OTHER PUBLICATIONS

Imai, Yoshio, "Structure-Property Relationship in Polyimides," Foundation of Material, vol. 4, No. 7, 2001, pp. 640-646.
(Continued)

*Primary Examiner* — Steven L Yeninas
(74) *Attorney, Agent, or Firm* — Foley & Lardner LLP (57) ABSTRACT

A moisture-sensitive film formed from a resin composition and containing a polyimide resin component. The polyimide resin component comprises a fluorinated polyimide resin. The polyimide resin component comprises a phthalimide ring and a benzene ring different from a benzene ring included in the phthalimide ring. Based on a total amount of the polyimide resin component, the benzene ring different from the benzene ring included in the phthalimide ring has a mass fraction W (Be) and the phthalimide ring has a mass fraction W (PhI) satisfying the following formula: W (PhI)/W (Be)≥1.2.

6 Claims, 1 Drawing Sheet

(58) Field of Classification Search
CPC .. G01N 27/225; G01N 27/226; G01N 27/227; G01N 27/246; G01N 25/66; G01R 27/2605

See application file for complete search history.

(56) References Cited

FOREIGN PATENT DOCUMENTS

| | | | | |
|---|---|---|---|---|
| CN | 106800653 A | 6/2017 | | |
| JP | 2008-215994 A | 9/2008 | | |
| JP | 2014-202726 A | 10/2014 | | |
| WO | WO-2016013403 A1 | * | 1/2016 | ............. C08G 73/10 |

OTHER PUBLICATIONS

International Searching Authority, "International Search Report," issued in connection with International Patent Application No. PCT/JP2019/012051, dated May 28, 2019.

International Searching Authority, "Written Opinion," issued in connection with International Patent Application No. PCT/JP2019/012051, dated May 28, 2019.

Office Action issued in corresponding Taiwanese Application No. TW201942200A, dated Apr. 28, 2022.

Office Action issued in corresponding Japanese Patent Application No. 2019-055268, dated Oct. 25, 2022.

Office Action issued in corresponding Chinese Patent Application No. 201980021769.2, dated Dec. 27, 2022.

Chinese Office Action issued in connection with CN Appl. Ser. No. 201980021769.2 dated Apr. 7, 2023.

* cited by examiner

MOISTURE-SENSITIVE FILM AND SENSOR USING SAME

CROSS-REFERENCE TO RELATED APPLICATIONS

The present application claims priority under 37 U.S.C. § 371 to International Patent Application No. PCT/JP2019/012051, filed Mar. 22, 2019, which claims priority to and the benefit of Japanese Patent Application No. 2018-063937, filed on Mar. 29, 2018. The contents of these applications are hereby incorporated by reference in their entireties.

TECHNICAL FIELD

The present invention relates to a moisture-sensitive film and a sensor using the moisture-sensitive film.

BACKGROUND ART

Patent Literature 1 discloses using a polyimide as a moisture-sensitive film for a humidity sensor.

CITATION LIST

Patent Literature

Patent Literature 1: Japanese Patent Laid-Open No. 2014-202726

SUMMARY OF INVENTION

Technical Problem

In a capacitance-type humidity sensor, a humidity-sensitive film is provided between electrodes, and environmental humidity is detected by detecting changes in the dielectric constant of the moisture-sensitive film based on change in the capacitance between the electrodes. Humidity sensors need to reduce the difference between changes in capacitance during the moisture absorption (humidification) process and changes in capacitance during the dehumidification (drying) process, that is, to have a low hysteresis.

An object of the present invention is to provide a moisture-sensitive film having a low hysteresis and a sensor using the moisture-sensitive film.

Solution to Problem

The present invention provides the following moisture-sensitive films and a sensor.

[1] A moisture-sensitive film formed from a resin composition containing a polyimide resin component, wherein
the polyimide resin component comprises a fluorinated polyimide resin,
the polyimide resin component comprises a phthalimide ring and a benzene ring different from a benzene ring included in the phthalimide ring, and
based on a total amount of the polyimide resin component, the benzene ring different from the benzene ring included in the phthalimide ring has a mass fraction W (Be) and the phthalimide ring has a mass fraction W (PhI) satisfying the following formula (I).

$$W(\text{PhI})/W(\text{Be}) \geq 1.2 \qquad (I)$$

[2] The moisture-sensitive film according to [1], wherein the mass fraction W (Be) is 20% by mass or more.

[3] The moisture-sensitive film according to [1] or [2], wherein the fluorinated polyimide resin includes a fluorinated polyimide resin having a phthalimide ring.

[4] The moisture-sensitive film according to any one of [1] to [3], wherein the fluorinated polyimide resin includes a fluorinated polyimide resin having a phthalimide ring and a benzene ring different from the benzene ring included in the phthalimide ring.

[5] A sensor comprising the moisture-sensitive film according to any one of [1] to [4].

Advantageous Effects of Invention

According to the present invention, a moisture-sensitive film having low hysteresis and a sensor using the moisture-sensitive film can be provided.

BRIEF DESCRIPTION OF DRAWINGS

FIGS. 1(a) and 1(b) FIG. 1(a) is a schematic plan view schematically illustrating an example of a sensor of the present invention.

DESCRIPTION OF EMBODIMENTS (Moisture-Sensitive Film)

The moisture-sensitive film of the present invention is a moisture-sensitive film formed from a resin composition containing a polyimide resin component, wherein
the polyimide resin component comprises a fluorinated polyimide resin,
the polyimide resin component comprises a phthalimide ring and a benzene ring different from a benzene ring included in the phthalimide ring, and
based on a total amount of the polyimide resin component, the benzene ring different from the benzene ring included in the phthalimide ring has a mass fraction W (Be) and the phthalimide ring has a mass fraction W (PhI) satisfying the following formula (I).

$$W(\text{PhI})/W(\text{Be}) \geq 1.2 \qquad (I)$$

The resin composition contains at least a polyimide resin component. In addition to the polyimide resin component, the resin composition may further contain a resin other than a polyimide resin, and additives such as an antioxidant, a flame retardant, a plasticizer, and an ultraviolet absorber. The content of the polyimide resin component in the resin composition is, based on the total amount of the resin composition, preferably 90% by mass or more, more preferably 95% by mass or more, further preferably 98% by mass or more, and may be 100% by mass. The "total amount of the resin composition" means the solid component included in the resin composition, and is the total amount of components other than the solvent.

The polyimide resin component includes one or more polyimide resins, and includes at least a fluorinated polyimide resin. Here, "polyimide resin component contained by the resin composition" refers to the polyimide resin included in the resin composition. That is, when the polyimide resin component includes one polyimide resin, "the polyimide resin component contained by the resin composition" means that one polyimide resin, and when the polyimide resin component includes two or more polyimide resins, "the polyimide resin component contained by the resin composition" means those two or more polyimide resins.

The fluorinated polyimide resin is not particularly limited as long as it is a resin having a polyimide structure and a fluoro group (fluorine atom), and may include two or more fluorinated polyimide resins. The fluorinated polyimide resin may include one or more fluorinated polyimide resins having a phthalimide ring. Further, the fluorinated polyimide resin may include one or more fluorinated polyimide resins having a benzene ring different from the benzene ring included in the phthalimide ring (hereinafter sometimes referred to as "benzene ring (Be)"). The fluorinated polyimide resin may include one or more fluorinated polyimide resins having a phthalimide ring and the benzene ring (Be).

The fluorinated polyimide resin may include at least one of a fluorinated polyimide resin including a phthalimide ring, a fluorinated polyimide resin including the benzene ring (Be), a fluorinated polyimide resin including a phthalimide ring and the benzene ring (Be), and a fluorinated polyimide resin not including a phthalimide ring and the benzene ring (Be). The fluorinated polyimide resin may include two or more of these fluorinated polyimide resins, and may include all of these fluorinated polyimide resins. The fluorinated polyimide resin preferably includes a fluorinated polyimide resin having a phthalimide ring, and more preferably includes a fluorinated polyimide resin having a phthalimide ring and the benzene ring (Be).

The fluorinated polyimide resin is, based on the total amount of the polyimide resin component, preferably 70% by mass or more, more preferably 80% by mass or more, and further preferably 90% by mass or more, and may be 100% by mass. When the fluorinated polyimide resin is a fluorinated polyimide resin including a phthalimide ring and the benzene ring (Be), or includes a fluorinated polyimide resin including a phthalimide ring and a fluorinated polyimide resin including the benzene ring (Be), the content of the fluorinated polyimide resin based on the total amount of the polyimide resin component is preferably 100% by mass.

Further, the polyimide resin component includes a phthalimide ring and the benzene ring (Be), which is a benzene ring different from the benzene ring included in the phthalimide ring. The phthalimide ring and the benzene ring (Be) included in the polyimide resin component may be the phthalimide ring and benzene ring (Be) included in one polyimide resin included in the polyimide resin component. Further, the polyimide resin component may include a polyimide resin having a phthalimide ring and a polyimide resin having the benzene ring (Be), and the phthalimide ring or benzene ring (Be) of each of these polyimide resins may be the phthalimide ring and the benzene ring (Be) included in the polyimide resin component. The polyimide resin having a phthalimide ring and the polyimide resin having the benzene ring (Be) may have a fluoro group as described above, or may not have a fluoro group.

The phthalimide ring of the polyimide resin component has a structure represented by the following formula (i). In this structure, the N atom and the C atoms forming the benzene ring may be bonded to a structural unit other than the phthalimide ring in the polyimide resin or a substituent. Hydrogen atoms may not be bonded to the N atom and the C atoms bonded to the other structural unit or the substituent. The phthalimide ring may be introduced onto either or both of the main chain or a side chain of the polyimide resin having a phthalimide ring, but it is preferable that the phthalimide ring be introduced onto the main chain. The term "main chain" means the longest chain of the polyimide resin.

[Formula 1]

(i)

The phthalimide ring of the polyimide resin component preferably has a structure represented by the following formula (ii). In formula (ii), *1 and *2 each represent a bond with an adjacent main chain structure. In formula (ii), the position of the bond represented by *2 is more preferably at position 4 or position 5.

[Formula 2]

(ii)

The benzene ring (Be) of the polyimide resin component may be bonded to a structural unit other than the benzene ring or a substituent in the polyimide resin. Hydrogen atoms may not be bonded to the C atoms forming the benzene ring bonded to the other structural unit or substituent. The benzene ring may be introduced onto either or both of the main chain or a side chain of the polyimide resin, but it is preferable that the benzene ring be introduced onto the main chain.

In the polyimide resin component, based on the total amount of the polyimide resin component, the benzene ring different from the benzene ring included in the phthalimide ring has a mass fraction W (Be) and the phthalimide ring has a mass fraction W (PhI) satisfying the following formula (I).

$$W(PhI)/W(Be) \geq 1.2 \quad (I)$$

The mass fraction W (Be) is the ratio of the total amount of the benzene ring (Be) to the total amount of the polyimide resin component. The mass fraction W (Be) can be calculated from the formula "total mass of benzene ring (Be)/total mass of polyimide resin component". For example, the mass fraction W (Be) can be calculated based on the molecular weight of the repeating unit in the polyimide resin and the molecular weight of the benzene ring (Be) included in the repeating unit. Here, the term "repeating unit" means a structure of the polyimide that is repeated in the polyimide resin, that is, a structure in which structural units derived from raw material components such as a diamine and tetracarboxylic acid described later are bonded.

The molecular weight per benzene ring (Be) is 76 regardless of the number of bonds in the benzene ring (Be) with structural units other than the benzene ring (Be) and the number of bonds of substituents in the polyimide resin. Further, when a plurality of benzene rings have a fused structure in which one side is shared, like naphthalene, each of the plurality of fused benzene rings is counted as a benzene ring, and the molecular weight of each benzene ring is 76.

The total mass of the polyimide resin component is calculated based on the molecular weight of the repeating unit in the polyimide resin. At this time, the molecular weight of the benzene ring (Be) moiety is not limited to 76 because it is calculated according to the number of bonds with other structural units and the number of bonds of substituents.

The mass fraction W (PhI) is the ratio of the total amount of the phthalimide ring to the total amount of the polyimide resin component. The mass fraction W (PhI) can be calculated from the formula "total mass of phthalimide ring/total mass of polyimide resin component". For example, the mass fraction W (PhI) can be calculated based on the molecular weight of the repeating unit in the polyimide resin and the molecular weight of the phthalimide ring included in the repeating unit.

The molecular weight per phthalimide ring is 145 regardless of the number of bonds in the phthalimide ring with structural units other than the phthalimide ring and the number of bonds of substituents in the polyimide resin. Further, when a plurality of phthalimide rings have a fused structure in which one side of the phthalimide ring is shared, each of the plurality of fused phthalimide rings is counted as a phthalimide ring, and the molecular weight of each phthalimide ring is 145. In the case of a fused structure in which a phthalimide ring and the benzene ring (Be) are sharing one side, the fused phthalimide ring and benzene ring (Be) are each counted as a phthalimide ring and the benzene ring (Be), and the molecular weights thereof are respectively 145 and 76. In the case of a diimide pyromellitic acid structure, that structure is counted as one phthalimide ring, and its molecular weight is 145.

The total mass of the polyimide resin component is calculated based on the molecular weight of the repeating unit in the polyimide resin. At this time, the molecular weight of the phthalimide ring moiety is not limited to 145 because it is calculated according to the number of bonds with other structural units and the number of bonds of substituents.

In formula (I), "W (PhI)/W (Be)" is more preferably 1.3 or more, and further preferably 1.6 or more, and usually 5 or less. Further, when "W (PhI)/W (Be)" is 1.2 or more, hysteresis of the moisture-sensitive film can be reduced. Although the reason for this is not clear, it is thought that in the molecular packing of the polyimide resin, the contribution to molecular packing by the conjugated amide bond of the phthalimide ring is larger than the contribution to molecular packing by the π-π stacking interaction of the benzene ring. Since moisture-sensitive films adsorb and desorb moisture according to the humidity of the environment, it is presumed that the more the molecular packing is promoted, the less the dimensional change to the moisture-sensitive film due to the adsorption and desorption of moisture, thereby enabling hysteresis to be reduced.

The mass fraction W (Be) is preferably 20% by mass or more, and may be 20.5% by mass or more, or may be 21% by mass or more. The mass fraction W (Be) is usually 45% by mass or less, and may be 40% by mass or less, or may be 30% by mass or less. When the mass fraction W (Be) is 20% by mass or more, a certain amount or more of benzene rings can be introduced into the polyimide resin component, and from the above formula (I), a certain amount or more of phthalimide rings can be introduced into the polyimide resin component. As a result, hysteresis in the moisture-sensitive film tends to be reduced.

The polyimide resin component may further include a polyimide resin that does not have any of a fluoro group, a phthalimide ring, and the benzene ring (Be).

The content of a polyimide resin having at least one of a fluoro group, a phthalimide ring, and the benzene ring (Be) is, based on the total amount of the polyimide resin component, preferably 80% by mass or more, more preferably 90% by mass or more, and further preferably 95% by mass or more, and may be 100% by mass.

The weight average molecular weight of each polyimide resin included in the polyimide resin component is preferably 20,000 or more, and more preferably 50,000 or more, and is preferably 1,000,000 or less, and more preferably 500,000 or less. The weight average molecular weight can be determined by a size exclusion chromatography device.

From the viewpoint of film-forming properties, it is preferable that the polyimide resins included in the polyimide resin component are soluble in the solvent. When those polyimide resins are soluble in the solvent, a moisture-sensitive film can be obtained by a coating method. The expression "soluble in the solvent" means that 1 part by mass or more of the polyimide resin dissolves when the polyimide resin is added to 100 parts by mass of the solvent and stirred at room temperature.

The solvent is not particularly limited, and examples of solvents that may be used include N-methyl-2-pyrrolidone, N,N-dimethylacetamide (DMAc), N,N-diethylacetamide, N,N-dimethylformamide, N,N-diethylformamide, N-methylcaprolactam, N-methylformamide, N,N,2-trimethylpropionamide, hexamethylphosphoramide, tetramethylene sulfone, dimethyl sulfoxide, m-cresol, phenol, p-chlorophenol, 2-chloro-4-hydroxytoluene, diglyme, triglyme, tetraglyme, dioxane, γ-butyrolactone (GBL), dioxolane, cyclohexanone, cyclopentanone (CYP), 1,4-dioxane, epsilon caprolactam, dichloromethane, and chloroform. These may be used singly or in a mixture of two or more.

The polyimide resin included in the polyimide resin component can be obtained, for example, by reacting a diamine and a tetracarboxylic acid. The diamine and the tetracarboxylic acid can be selected, for example, from the exemplified compounds described below. Here, the diamine and the tetracarboxylic acid also include their respective derivatives. When simply the word "diamine" is used in the present specification, it means diamine and its derivatives, and when simply the word "tetracarboxylic acid" is used, it similarly also means tetracarboxylic acid and its derivatives.

The fluorinated polyimide resin can be obtained by using a compound having a fluoro group on at least one of the diamine and the tetracarboxylic acid. The diamine and the tetracarboxylic acid may both have a fluoro group.

The polyimide resin having a phthalimide ring can be obtained by using, for example, a compound having a phthalic anhydride structure that is a derivative of a tetracarboxylic acid and a diamine such that the phthalimide ring is introduced by the reaction of the diamine and the tetracarboxylic acid.

The polyimide resin having the benzene ring (Be) can be obtained by using a compound having the benzene ring (Be) in at least one of the diamine and the tetracarboxylic acid. The diamine and the tetracarboxylic acid may both have the benzene ring (Be).

Examples of the diamine used to obtain the polyimide resin included in the polyimide resin component include diamines and a diaminodisilane. Of these, it is preferable to use a diamine. Examples of the diamine include aromatic diamines, aliphatic diamines, and a mixture thereof. Of these, an aromatic diamine is preferable. The term "aromatic diamine" refers to a diamine in which an amino group is directly bonded to an aromatic ring, and an aliphatic group, an alicyclic group, or another substituent may be included in a part of its structure. The term "aliphatic diamine" refers to a diamine in which an amino group is directly bonded to an aliphatic group or an alicyclic group, and an aromatic group or another substituent may be included in a part of its structure.

Examples of the aromatic diamine include phenylenediamine, diaminotoluene, diaminobiphenyl, bis(aminophenoxy)biphenyl, diaminonaphthalene, diaminodiphenyl ether, bis[(aminophenoxy)phenyl]ether, diaminodiphenyl sulfide, bis[(aminophenoxy)phenyl]sulfide, diaminodiphenyl sulfone, bis[(aminophenoxy)phenyl]sulfone, diaminobenzophenone, diaminodiphenylmethane, bis[(aminophenoxy)phenyl]methane, bisaminophenylpropane, bis[(aminophenoxy)phenyl]propane, bisaminophenoxybenzene, bis[(amino-α,α'-dimethylbenzyl)benzene, bisaminophenyldiisopropylbenzene, bisaminophenylfluorene, bisaminophenylcyclopentane, bisaminophenylcyclohexane, bisaminophenylnorbornane, bisaminophenyladamantane, and a compound in which one or more hydrogen atoms in the above-mentioned compounds are replaced with a fluorine atom or a hydrocarbon group containing a fluorine atom (such as a trifluoromethyl group). These aromatic diamines may be used singly or in combinations of two or more.

Examples of the phenylenediamine include m-phenylenediamine and p-phenylenediamine.

Examples of the diaminotoluene include 2,4-diaminotoluene and 2,6-diaminotoluene.

Examples of the diaminobiphenyl include benzidine (also known as 4,4'-diaminobiphenyl), o-tolidine, m-tolidine, 3,3'-dihydroxy-4,4'-diaminobiphenyl, 2,2-bis(3-amino-4-hydroxyphenyl)propane (BAPA), 3,3'-dimethoxy-4,4'-diaminobiphenyl, 3,3'-dichloro-4,4'-diaminobiphenyl, 2,2'-dimethyl-4, 4'-diaminobiphenyl, and 3,3'-dimethyl-4,4'-diaminobiphenyl.

Examples of the bis(aminophenoxy)biphenyl include 4,4'-bis(4-aminophenoxy)biphenyl (BAPB), 3,3'-bis(4-aminophenoxy)biphenyl, 3,4'-bis(3-aminophenoxy)biphenyl, 4,4'-bis(2-methyl-4-aminophenoxy)biphenyl, 4,4'-bis(2,6-dimethyl-4-aminophenoxy)biphenyl, and 4,4'-bis(3-aminophenoxy) biphenyl.

Examples of the diaminonaphthalene include 2,6-diaminonaphthalene and 1,5-diaminonaphthalene.

Examples of the diaminodiphenyl ether include 3,4'-diaminodiphenyl ether and 4,4'-diaminodiphenyl ether.

Examples of the bis[(aminophenoxy)phenyl]ether include bis[4-(3-aminophenoxy)phenyl]ether, bis[4-(4-aminophenoxy)phenyl]ether, bis[3-(3-aminophenoxy)phenyl]ether, bis(4-(2-methyl-4-aminophenoxy)phenyl)ether, and bis(4-(2,6-dimethyl-4-aminophenoxy)phenyl)ether.

Examples of the diaminodiphenyl sulfide include 3,3'-diaminodiphenyl sulfide, 3,4'-diaminodiphenyl sulfide, and 4,4'-diaminodiphenyl sulfide.

Examples of the bis[(aminophenoxy)phenyl]sulfide include bis[4-(4-aminophenoxy)phenyl]sulfide, bis[3-(4-aminophenoxy)phenyl]sulfide, bis[4-(3-aminophenoxy)phenyl]sulfide, bis[3-(4-aminophenoxy)phenyl]sulfide, and bis[3-(3-aminophenoxy)phenyl]sulfide.

Examples of the diaminodiphenyl sulfone include 3,3'-diaminodiphenyl sulfone, 3,4'-diaminodiphenyl sulfone, and 4,4'-diaminodiphenyl sulfone.

Examples of the bis[(aminophenoxy)phenyl]sulfone include bis[3-(4-aminophenoxy)phenyl]sulfone, bis[4-(4-aminophenoxy)phenyl]sulfone, bis[3-(3-aminophenoxy)phenyl]sulfone, bis[4-(3-aminophenoxy)phenyl]sulfone, bis[4-(4-aminophenoxy)phenyl]sulfone, bis[4-(2-methyl-4-aminophenoxy)phenyl]sulfone, and bis[4-(2,6-dimethyl-4-aminophenoxy)phenyl]sulfone.

Examples of the diaminobenzophenone include 3,3'-diaminobenzophenone and 4,4'-diaminobenzophenone.

Examples of the diaminodiphenylmethane include 3,3'-diaminodiphenylmethane, 3,4'-diaminodiphenylmethane, and 4,4'-diaminodiphenylmethane.

Examples of the bis[(aminophenoxy)phenyl]methane include bis[4-(3-aminophenoxy)phenyl]methane, bis[4-(4-aminophenoxy)phenyl]methane, bis[3-(3-aminophenoxy)phenyl]methane, and bis[3-(4-aminophenoxy)phenyl]methane.

Examples of the bisaminophenylpropane include 2,2-bis(4-aminophenyl)propane, 2,2-bis(3-aminophenyl)propane, 2-(3-aminophenyl)-2-(4-aminophenyl)propane, 2,2-bis(2-methyl-4-aminophenyl)propane, and 2,2-bis(2,6-dimethyl-4-aminophenyl)propane.

Examples of the bis[(aminophenoxy)phenyl]propane include 2,2-bis[4-(2-methyl-4-aminophenoxy)phenyl]propane, 2,2-bis[4-(2,6-dimethyl-4)-aminophenoxy)phenyl]propane, 2,2-bis[4-(3-aminophenoxy)phenyl]propane, 2,2-bis[4-(4-aminophenoxy)phenyl]propane, 2,2-bis[3-(3-aminophenoxy)phenyl]propane, and 2,2-bis[3-(4-aminophenoxy)phenyl]propane.

Examples of the bisaminophenoxybenzene include 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,4-bis(2-methyl-4-aminophenoxy)benzene, 1,4-bis(2,6-dimethyl-4-aminophenoxy)benzene, 1,3-bis(2-methyl-4-aminophenoxy)benzene, and 1,3-bis(2,6-dimethyl-4-aminophenoxy)benzene.

Examples of the bis(amino-α, α'-dimethylbenzyl)benzene (also called bisaminophenyldiisopropylbenzene) include 1,4-bis(4-amino-α,α'-dimethylbenzyl)benzene (BiSAP, also called α,α'-bis(4-aminophenyl)-1,4-diisopropylbenzene), 1,3-bis[4-(4-amino-6-methylphenoxy)-α,α'-dimethylbenzyl]benzene, α,α'-bis(2-methyl-4-aminophenyl)-1,4-diisopropylbenzene, α,α'-bis(2,6-dimethyl-4-aminophenyl)-1,4-diisopropylbenzene, α,α'-bis(3-aminophenyl)-1,4-diisopropylbenzene, α,α'-bis(4-aminophenyl)-1,3-diisopropylbenzene, α,α'-bis(2-methyl-4-aminophenyl)-1,3-diisopropylbenzene, α,α'-bis(2,6-dimethyl-4-aminophenyl)-1,3-diisopropylbenzene, and α,α'-bis(3-aminophenyl)-1,3-diisopropylbenzene.

Examples of the bisaminophenylfluorene include 9,9-bis(4-aminophenyl)fluorene, 9,9-bis(2-methyl-4-aminophenyl)fluorene, and 9,9-bis(2,6-dimethyl-4)-aminophenyl)fluorene.

Examples of the bisaminophenylcyclopentane include 1,1-bis(4-aminophenyl)cyclopentane, 1,1-bis(2-methyl-4-aminophenyl)cyclopentane, and 1,1-bis(2,6-dimethyl-4-aminophenyl)cyclopentane.

Examples of the bisaminophenylcyclohexane include 1,1-bis(4-aminophenyl)cyclohexane, 1,1-bis(2-methyl-4-aminophenyl)cyclohexane, 1,1-bis(2,6-dimethyl-4-aminophenyl)cyclohexane, and 1,1-bis(4-aminophenyl)4-methylcyclohexane.

Examples of the bisaminophenylnorbornane include 1,1-bis(4-aminophenyl)norbornane, 1,1-bis(2-methyl-4-aminophenyl)norbornane, and 1,1-bis(2,6-dimethyl-4-aminophenyl)norbornane.

Examples of the bisaminophenyl adamantane include 1,1-bis(4-aminophenyl)adamantane, 1,1-bis(2-methyl-4-aminophenyl)adamantane, and 1,1-bis(2,6-dimethyl-4-aminophenyl)adamantane.

Examples of the aliphatic diamine include ethylenediamine, hexamethylenediamine, polyethylene glycol bis(3-aminopropyl)ether, polypropylene glycol bis(3-aminopropyl)ether, 1,3-bis(aminomethyl)cyclohexane, 1,4-bis(aminomethyl)cyclohexane, 4,4'-methylenebis(2-methylcyclohexylamine) (MCHM), metaxylylenediamine, paraxylylenediamine, 1,4-bis(2-amino-isopropyl)benzene, 1,3-bis(2-amino-isopropyl)benzene, isophoronediamine, norbornanediamine, and siloxanediamines. Further examples include a compound in which one or more hydrogen atoms in the above-mentioned compounds are replaced with a fluorine atom or a hydrocarbon group containing a fluorine atom (such as a trifluoromethyl group). These can be used singly or in a mixture of two or more.

In order to obtain a fluorinated polyimide resin having a benzene ring (Be) that can be included in the polyimide resin component, as the diamine, it is preferable to use an aromatic diamine having a fluoro group, and it is more preferable to use 2,2'-bis(trifluoromethyl)benzidine (TFMB).

Examples of the tetracarboxylic acid used to obtain the polyimide resin included in the polyimide resin component include tetracarboxylic acids, tetracarboxylic acid esters, and tetracarboxylic dianhydrides. Among these, it is preferable to use a tetracarboxylic dianhydride.

Examples of the tetracarboxylic dianhydride include pyromellitic dianhydride, 3,3',4,4'-benzophenonetetracarboxylic dianhydride, 1,4-hydroquinonedibenzoate-3,3',4,4'-tetracarboxylic dianhydride, 3,3',4,4'-biphenyltetracarboxylic dianhydride (BPDA), 3,3',4,4'-diphenylethertetracarboxylic dianhydride (ODPA), 1,2,4,5-cyclohexanetetracarboxylic dianhydride (HPMDA), 1,2,3,4-cyclobutanetetracarboxylic dianhydride, 1,2,4,5-cyclopentanetetracarboxylic dianhydride, bicyclo[2,2,2]oct-7-ene-2,3,5,6-tetracarboxylic dianhydride, 2,3,3',4'-biphenyltetracarboxylic dianhydride, 3,3',4,4'-benzophenonetetracarboxylic dianhydride, 4,4-(p-phenylenedioxy)diphthalic dianhydride, 4,4-(m-phenylenedioxy)diphthalic dianhydride;

tetracarboxylic dianhydrides of 2,2-bis(3,4-dicarboxyphenyl)propane, 2,2-bis(2,3-dicarboxyphenyl)propane, bis(3,4-dicarboxyphenyl)sulfone, bis(3,4-dicarboxyphenyl)ether, bis(2,3-dicarboxyphenyl)ether, 1,1-bis(2,3-dicarboxyphenyl)ethane, bis(2,3-dicarboxyphenyl)methane, bis(3,4-dicarboxyphenyl)methane, and the like; and compounds in which one or more hydrogen atoms in the above-mentioned compounds are replaced with a fluorine atom or a hydrocarbon group including a fluorine atom (such as a trifluoromethyl group). These tetracarboxylic dianhydrides may be used singly or in a mixture of two or more.

To obtain a fluorinated polyimide resin having a phthalimide ring that can be included in the polyimide resin component, it is preferable to use a tetracarboxylic dianhydride having a fluoro group, and it is more preferable to use 4,4'-(1,1,1,3,3,3-hexafluoropropane-2,2-diyl)diphthalic dianhydride (6FDA).

(Sensor)

The sensor of the present invention includes the above-described moisture-sensitive film. The moisture-sensitive film can absorb and desorb the moisture included in the environmental atmosphere in which the moisture-sensitive film is placed according to the humidity of that environment. Therefore, a sensor including the moisture-sensitive film can be used as a capacitance type sensor that detects humidity based on changes in the dielectric constant of the moisture-sensitive film.

Figure 1A:
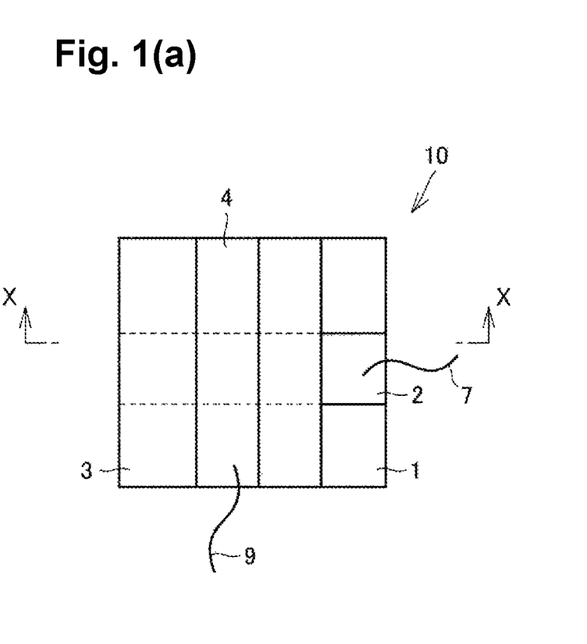
Figure 1B:
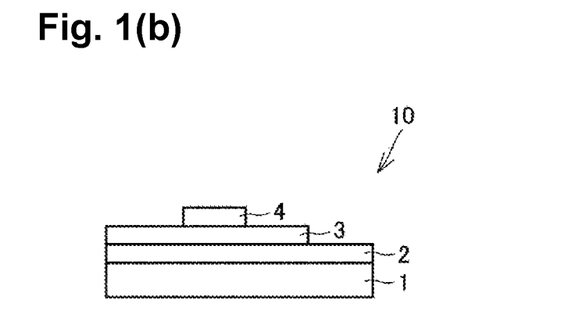
FIG. 1(b) is a cross-sectional view taken along the line X-X of FIG. 1(a).

The sensor of the present invention will now be described with reference to the drawings. FIG. 1(a) is a schematic plan view schematically illustrating an example of the sensor of the present invention. FIG. 1(b) is a cross-sectional view taken along the line X-X of FIG. 1(a). As illustrated in FIGS. 1(a) and 1(b), a sensor 10 includes an insulating substrate 1, a lower electrode 2, a moisture-sensitive film 3, an upper electrode 4, a lower electrode lead wire 7, and an upper electrode lead wire 9. The lower electrode 2 is formed on the insulating substrate 1, and the lower electrode lead wire 7 is connected to the lower electrode 2. The moisture-sensitive film 3 is formed on the insulating substrate 1 so as to cover a region other than the portion connecting with the lower electrode lead wire 7 of the lower electrode 2. The upper electrode 4 is formed on the moisture-sensitive film 3 so as to extend in a direction orthogonal to the direction in which the lower electrode 2 extends. The upper electrode lead wire 9 is connected to the upper electrode 4.

The insulating substrate 1 may be a glass substrate having insulating properties, a metal oxide substrate formed of a metal oxide such as aluminum oxide or silicon oxide, or a substrate formed by covering the surface of a conductive substrate with an insulating material such as a metal oxide.

The lower electrode 2 can be formed using a conductive metal. The lower electrode 2 can be formed from at least one selected from the group consisting of, for example, gold, copper, aluminum, iron, tin, zinc, nickel, titanium, molybdenum, chromium, tungsten, lead, an alloy including two or more metals selected from among those metals, aluminum-silicon alloys, and polycrystalline silicon. The lower electrode 2 can be formed on the insulating substrate 1 by a known method, such as a vacuum vapor deposition method, a sputtering method, an ion plating method, a chemical vapor deposition method, an MBE (molecular beam epitaxy) method, and a plating method. The thickness of the lower electrode 2 is preferably 100 nm or more and 500 nm or less, and more preferably 100 nm or more and 300 nm or less.

The moisture-sensitive film 3 can be formed by applying a coating liquid including a resin composition containing the above-mentioned fluorinated polyimide resin and a solvent onto the insulating substrate 1 on which the lower electrode 2 has been formed, and drying the coating liquid. The connecting portion between the lower electrode 2 and the lower electrode lead wire 7 may be formed by, for example, masking the connecting portion and applying the coating liquid, or the coating liquid may be applied and then the coating liquid applied on the connecting portion may be dissolved with a solvent or the like to expose the lower electrode 2. As the application method, a known application method may be employed, such as a spin coating method, a screen printing method, an inkjet printing method, a dip coating method, an air knife coating method, a roll coating method, a gravure coating method, or a blade coating method. The thickness of the moisture-sensitive film 3 is preferably 0.3 µm or more and 5 µm or less, and more preferably 0.3 µm or more and 3 µm or less.

The upper electrode 4 can be formed on the moisture-sensitive film 3 formed on the insulating substrate 1, and can be formed using the materials and formation method described in relation to the lower electrode 2. The thickness of the upper electrode 4 is preferably 100 nm or more and 500 nm or less, and more preferably 100 nm or more and 300 nm or less.

As described above, the dielectric constant of the moisture-sensitive film 3 changes when water is adsorbed or desorbed. In the sensor 10, the portion where the lower electrode 2 and the upper electrode 4 intersect functions as a capacitor. Therefore, humidity can be measured by detecting changes in the dielectric constant of the moisture-sensitive film 3 at this portion as changes in the capacitance between the lower electrode 2 and the upper electrode 4. Since the sensor 10 includes the above-mentioned moisture-sensitive film 3, it is possible to reduce hysteresis to changes in humidity.

Hysteresis can be evaluated by the following method. First, a sensor including the moisture-sensitive film 3 is produced, and the sensor is left to stand in a high humidity atmosphere at room temperature. Then, the sensor is left to stand in an atmosphere at the same temperature and having normal humidity (humidity 40 to 60%) for a predetermined time, and the capacitance Cp (H) is measured. Subsequently, the sensor is left to stand in an atmosphere at the same temperature and having a lower relative humidity, then the sensor is left to stand in an atmosphere at the same temperature and having normal humidity for a predetermined time, and the capacitance Cp (L) is measured.

In the examples described below, the capacitance Cp (H) is measured by leaving the sensor to stand for about 1 hour in an atmosphere having a relative humidity of 90% and a temperature of 30° C., then immediately placing the sensor in an atmosphere having a relative humidity of 60% and a temperature of 30° C., and measuring the capacitance 10 minutes later. Further, the capacitance Cp (L) is measured by leaving the sensor to stand for about 1 hour in an atmosphere having a relative humidity of 30% and a temperature of 30° C., then immediately placing the sensor in an atmosphere having a relative humidity of 60% and a temperature of 30° C., and measuring the capacitance 10 minutes later.

Hysteresis (unit: %) can be calculated from the following formula (II) based on the measured capacitances.

Hysteresis={(Cp(H)−Cp(L))/Cp(L)}×100  (II)

It is preferable that hysteresis is low, and is preferably less than 6%. More preferably, hysteresis is 5% or less, further preferably 3% or less, still further preferably 1% or less, even further preferably 0.6% or less, and particularly preferably 0%. When hysteresis is within the above range, even if moisture is adsorbed in a high humidity environment, the moisture will not easily penetrate into the moisture-sensitive film, or even if moisture does penetrate into the moisture-sensitive film, the moisture can easily escape. Therefore, dimensional changes such as expansion do not easily occur, and moisture is not readily retained in the moisture-sensitive film. As a result, for a sensor provided with the moisture-sensitive film, even if it is left to stand in a high humidity environment and then in a low humidity environment, or in a low humidity environment and then in a high humidity environment, the sensor can detect a constant capacitance value for a constant humidity. Therefore, humidity can be detected more accurately, and deterioration of the moisture-sensitive film due to dimensional change or the like can be suppressed.

EXAMPLES

The present invention will now be described in more detail with reference to examples and comparative examples, but the present invention is not limited to these examples and comparative examples. Unless otherwise specified, "%" and "parts" in the examples and comparative examples refer to % by mass and parts by mass.

[Evaluation of Hysteresis]

Using the sensors obtained in the examples and comparative examples, evaluation of hysteresis was carried out as follows. Firstly, the sensor was conditioned for about 1 hour in an atmosphere having a relative humidity of 90% and a temperature of 30° C., then immediately placed in an atmosphere having a relative humidity of 60% and a temperature of 30° C., and the capacitance Cp (H) was measured 10 minutes later. Next, the sensor was conditioned for about 1 hour in an atmosphere having a relative humidity of 30% and a temperature of 30° C., then immediately placed in an atmosphere having a relative humidity of 60% and a temperature of 30° C., and the capacitance Cp (L) was measured 10 minutes later. Hysteresis (unit: %) was calculated from the following formula (II) based on the measured capacitances.

Hysteresis={(Cp(H)−Cp(L))/Cp(L)}×100  (II)

[Production of Resin 1]

A polyimide powder represented by formula (3) was obtained in accordance with the description in Example 1 of International Publication No. WO 2017/179367. The polyimide powder was obtained by using 2,2'-bis(trifluoromethyl)benzidine (TFMB) represented by formula (1) as a diamine and 4,4'-(1,1,1,3,3,3-hexafluoropropane-2,2-diyl) diphthalic dianhydride (6FDA) represented by formula (2) as a tetracarboxylic dianhydride, respectively.

[Formula 3]

(1)

(2)

(3)

[Production of Resin 2]

As diamines, 4,4'-bis(4-aminophenoxy)biphenyl (BAPB) represented by formula (4) and 1,4-bis(4-amino-α,α-dimethylbenzyl)benzene (BiSAP) represented by formula (5) were used, and as a tetracarboxylic dianhydride, 1,2,4,5-cyclohexanetetracarboxylic dianhydride (HPMDA) represented by formula (6) was used. A polyimide resin solution was obtained in accordance with the description of Synthesis Example 2 in Japanese Patent Laid-Open No. 2016-186004, except that the molar ratio of BAPB:BiSAP:HPMDA was 0.5:0.5:1. A polyimide powder was obtained in accordance with the description in Example 2 of Japanese Patent Laid-Open No. 2016-186004.

[Formula 4]

(4)

(5)

(6)

[Production of Resin 3]

A four-necked flask equipped with a stirrer was added with 4.68 g (0.02 mol) of 4,4'-methylenebis(2-methylcyclohexylamine) (MCHM) (manufactured by Tokyo Chemical Industry Co., Ltd.) represented by formula (7) as a diamine, 45 g of N,N-dimethylacetamide (DMAc), and 0.11 g of acetic acid, and the mixture was stirred. Then, the flask was added with 15.05 g (0.06 mol) of 2,2-bis(3-amino-4-hydroxyphenyl) propane (BAPA) (manufactured by Tokyo Chemical Industry Co., Ltd.) represented by formula (8) as a diamine, 22.93 g (0.078 mol) of 3,3',4,4'-biphenyltetracarboxylic dianhydride (BPDA) (manufactured by Tokyo Chemical Industry Co., Ltd.) represented by formula (9) as a tetracarboxylic dianhydride and 45 g of N,N-dimethylacetamide (DMAc), and the mixture was stirred in an oil bath at a temperature of 80° C. for 8 hours. Next, the flask was added with 24.5 g of toluene, a polymerization reaction was carried out for 12 hours in an oil bath at a temperature of 190° C., and the toluene was distilled off under atmospheric pressure to obtain a polyimide solution. Methanol was added to the obtained polyimide solution to bring the total amount to 1500 g. The precipitate was washed and dried to obtain a polyimide powder.

[Formula 5]

(7)

(8)

(9)

Examples 1 to 6, Comparative Examples 1 to 3

(Production of Varnish)

A mixed solvent of 19.6 g of γ-butyrolactone (GBL) and 8 g of cyclopentanone (CYP) was prepared as a solvent. In the mixed solvent, the mass ratio of GBL and CYP was GBL:CYP=71: 29. Resin 1, resin 2 and/or resin 3 were dissolved in the mixed solvent in the addition amounts shown in Table 1 to prepare a varnish. The total amount of each varnish was 30 g, and the solid content concentration was 8%.

The phthalimide ring content, the benzene ring (Be) content, and the ratio (W (PhI)/W (Be)) of the mass fraction W (Be) of the benzene ring (Be) and the mass fraction W (PhI) of the phthalimide ring in the resin included in each varnish are shown in Table 1.

These contents and the mass fraction ratio are values calculate based on the amount of resin 1 and resin 2 added during the varnish production, in which the molecular weight of the phthalimide ring was 145, the molecular weight of the benzene ring (Be) was 76, the molecular weight of the repeating unit of resin 1 was 728, the molecular weight of the repeating unit of resin 2 was 545, the molecular weight of the repeating unit of resin 3 was 511, the number of phthalimide rings in the repeating unit of resin 1 was 2, the number of benzene rings (Be) in the repeating unit of resin 1 was 2, the number of phthalimide rings in the repeating unit of resin 2 was 0, the number of benzene rings (Be) in the repeating unit of resin 2 was 3.5, the number of phthalimide rings in the repeating unit of resin 3 was 2, and the number of benzene rings (Be) in the repeating unit of resin 3 was 1.5.

(Production of Sensor)

The sensor illustrated in FIGS. 1(a) and 1(b) was produced according to the following procedure. A 2.5 cm square alumina substrate was used as the insulating substrate. The surface of the insulating substrate was masked by adhering tape to the insulating substrate such that a region in which a lower electrode having a size of 1 cm (width)×2.5 cm (length in the direction along the side of the insulating substrate) could be formed was exposed to a central portion of the insulating substrate. Vapor deposition was carried out on the surface of the insulating substrate masked with tape by using an ion coater IB-3 (manufactured by Eicoh Co., Ltd.) with a vapor deposition source of Au under vapor deposition conditions of 5 to 8 mA for 10 minutes. Then, the mask tape was peeled off to obtain an insulating substrate on which a lower electrode having a size of 1 cm×2.5 cm was formed.

The insulating substrate on which the lower electrode was formed was cleaned with acetone, and then a part of the lower electrode was masked with tape to form a connecting portion with the lead wire for the lower electrode. Then, the varnish produced above was spin-coated onto the surface of the insulating substrate on which the lower electrode was formed. Spin coating was performed for 30 seconds at the number of rotations shown in Table 1 such that the thickness of the moisture-sensitive film after drying would be 3 Then, the mask tape was peeled off, the insulating substrate was dried at a temperature of 170° C. for 0.5 hours, and then further dried at a temperature of 250° C. for 1 hour to form a moisture-sensitive film. In all of the examples and comparative examples, the thickness of the obtained moisture-sensitive film was 3 μm.

The surface of the insulating substrate on which the moisture-sensitive film had been formed was masked by adhering tape to the insulating substrate such that a region in which an upper electrode orthogonal to the lower electrode and having a size of 1 cm (width)×2.5 cm (length in the direction along the side of the insulating substrate) could be formed was exposed to the central portion of the insulating substrate on which the moisture-sensitive film had been formed. Then, vapor deposition was carried out on the surface of the insulating substrate on which the moisture-sensitive film had been formed by using an ion coater IB-3 (manufactured by Eicoh Co., Ltd.) with a vapor deposition source of Au under vapor deposition conditions of 5 to 8 mA for 10 minutes. Then, the mask tape was peeled off to obtain a sensor in which an upper electrode having a size of 1 cm×2.5 cm was formed on the moisture-sensitive film. Hysteresis was evaluated using the obtained sensor. The results are shown in Table 1.

the structure derived from diamine does not contain either an ether group or an amide bond (—NHCO—), the polyimide resin component comprises a phthalimide ring and a benzene ring different from a benzene ring included in the phthalimide ring, and based on a total amount of the polyimide resin component, the benzene ring different from the benzene ring included in the phthalimide ring has a mass fraction W (Be) and the phthalimide ring has a mass fraction W (PhI) satisfying the following formula (I), $$W(\text{PhI})/W(\text{Be}) \geq 1.2 \tag{I}$$

2. The moisture-sensitive film according to claim 1, wherein the mass fraction W (Be) is 20% by mass or more.

3. The moisture-sensitive film according to claim 1, wherein the fluorinated polyimide resin includes a fluorinated polyimide resin having a phthalimide ring.

4. The moisture-sensitive film according to claim 1, wherein the fluorinated polyimide resin includes a fluorinated polyimide resin having a phthalimide ring and a benzene ring different from the benzene ring included in the phthalimide ring.

5. A sensor comprising the moisture-sensitive film according to claim 1.

TABLE 1

| | Varnish | | | Number of | | | | |
| | Resin 1 [g] | Resin 2 [g] | Resin 3 [g] | Rotations [rpm] | W (PhI) [% by mass] | W (Be) [% by mass] | W (PhI)/ W(Be) | Hysteresis [%] |
|---|---|---|---|---|---|---|---|---|
| Example 1 | 2.400 | 0 | 0 | 3395 | 39.84 | 20.88 | 1.91 | 0 |
| Example 2 | 2.302 | 0.098 | 0 | 3488 | 38.21 | 22.02 | 1.74 | 0.11 |
| Example 3 | 2.150 | 0.250 | 0 | 3098 | 35.69 | 23.79 | 1.50 | 0.49 |
| Example 4 | 2.078 | 0.322 | 0 | 2960 | 34.49 | 24.63 | 1.40 | 0.23 |
| Example 5 | 1.978 | 0.422 | 0 | 2777 | 32.83 | 25.79 | 1.27 | 0.51 |
| Example 6 | 0.700 | 0 | 1.700 | 3112 | 51.82 | 21.85 | 2.37 | 0 |
| Comparative Example 1 | 0 | 2.400 | 0 | 1282 | 0 | 48.81 | 0 | 7.18 |
| Comparative Example 2 | 1.150 | 1.250 | 0 | 1612 | 19.09 | 35.43 | 0.54 | 6.29 |
| Comparative Example 3 | 1.682 | 0.718 | 0 | 2999 | 27.92 | 29.23 | 0.96 | 0.53 |

REFERENCE SIGNS LIST 1 insulating substrate
2 lower electrode
3 moisture-sensitive film
4 upper electrode
7 lower electrode lead wire
9 upper electrode lead wire
10 sensor

The invention claimed is:

1. A moisture-sensitive film formed from a resin composition containing a polyimide resin component, wherein
the polyimide resin component comprises a fluorinated polyimide resin,
the fluorinated polyimide resin has structure derived from diamine and structure derived from tetracarboxylic acid,
the structure derived from diamine and the structure derived from tetracarboxylic acid each contain a fluorine atom, 6. A moisture-sensitive film formed from a resin composition containing a polyimide resin component, wherein
the polyimide resin component contains a polyimide represented by formula (3):

based on a total amount of the polyimide resin component, the benzene ring different from the benzene ring included in the phthalimide ring has a mass fraction W (Be) and the phthalimide ring has a mass fraction W (PhI) satisfying the following formula (I):

$$W(\text{PhI})/W(\text{Be}) \geq 1.2 \tag{I}$$

* * * * *